United States Patent [19]
Taylor

[11] Patent Number: 6,058,464
[45] Date of Patent: *May 2, 2000

[54] CIRCUITS, SYSTEMS AND METHOD FOR ADDRESS MAPPING

[75] Inventor: Ronald T. Taylor, Grapevine, Tex.

[73] Assignee: Cirrus Logic, Inc.

[*] Notice: This patent issued on a continued prosecution application filed under 37 CFR 1.53(d), and is subject to the twenty year patent term provisions of 35 U.S.C. 154(a)(2).

[21] Appl. No.: 08/677,125

[22] Filed: Jul. 9, 1996

Related U.S. Application Data

[63] Continuation-in-part of application No. 08/534,279, Sep. 27, 1995.

[51] Int. Cl.⁷ ..................................................... G06F 12/02
[52] U.S. Cl. ........................ 711/217; 711/218; 711/219; 711/220; 395/829; 345/1
[58] Field of Search ................... 395/497.01, 497.02, 395/497.03, 497.04, 412, 401, 404, 427, 438, 829; 710/8, 9; 711/220, 170, 171, 173, 172, 219, 218, 217; 345/1, 3

[56] References Cited

U.S. PATENT DOCUMENTS

| | | | |
|---|---|---|---|
| 4,775,931 | 10/1988 | Dickie et al. | 710/9 |
| 4,800,376 | 1/1989 | Suga et al. | 345/1 |
| 5,117,350 | 5/1992 | Parrish et al. | 395/401 |
| 5,319,755 | 6/1994 | Farmwald et al. | 395/284 |
| 5,408,129 | 4/1995 | Farmwald et al. | 257/692 |
| 5,430,676 | 7/1995 | Ware et al. | 365/189.01 |
| 5,434,817 | 7/1995 | Ware et al. | 365/189.02 |
| 5,465,101 | 11/1995 | Akiba et al. | 345/1 |
| 5,841,418 | 11/1998 | Bril et al. | 345/3 |

FOREIGN PATENT DOCUMENTS

| | | |
|---|---|---|
| 0068569 | 1/1983 | European Pat. Off. . |
| 0280582 | 8/1988 | European Pat. Off. . |
| 0 393 290 | 4/1989 | European Pat. Off. ........ G06F 13/38 |
| 0393290 | 10/1990 | European Pat. Off. . |
| 0498995 | 8/1992 | European Pat. Off. . |
| 06019424 | 1/1994 | Japan . |
| 2156556 | 10/1985 | United Kingdom . |

OTHER PUBLICATIONS

"Systems & Computers in Japan" vol. 21, No. 3, 1990, New York pp. 514–23, Milshii, et al. "A Highly parallel Processor Cap".

"IBM Technical Disclosure Bulletin" vol. 30, No. 10, Mar. 1988, pp. 185–187 "Mixed Memory Card Size Through Address Gap Handling".

*Primary Examiner*—Eddie P. Chan
*Assistant Examiner*—Than Nguyen
*Attorney, Agent, or Firm*—James J. Murphy; Steven A. Shaw

[57] ABSTRACT

An information processing system 400 includes a subsystem 402 having a processing resource 404 and a bus interface 403. An active logic mapping signal is presented to a mapping input bus interface 403. The system also includes a master processing device which is operable to write at least some bits of a starting address into bus interface 403, determine an ending address for subsystem 402 and lock subsystem 402.

23 Claims, 3 Drawing Sheets

CIRCUITS, SYSTEMS AND METHOD FOR ADDRESS MAPPING

CROSS REFERENCE TO RELATED APPLICATIONS

The present application is a continuation-in-part of copending and coassigned U.S. Patent Application Ser. No. 08/534,279 (Attorney's Docket number 2836-P029US), entitled "CIRCUITS, SYSTEMS AND METHODS FOR MEMORY MAPPING AND DISPLAY CONTROL SYSTEMS USING THE SAME" and filed Sep. 27, 1995.

TECHNICAL FIELD OF THE INVENTION

The present invention relates in general to information processing systems and in particular to address mapping circuits, systems and methods.

BACKGROUND OF THE INVENTION

A typical processing system with video/graphics display capability includes a central processing unit (CPU), a display controller coupled with the CPU by a CPU bus, a system memory also coupled to the CPU bus, a frame buffer coupled to the display controller by a local bus, peripheral circuitry (e.g., clock drivers and signal converters), display driver circuitry, and a display unit. Additionally, the system may include peripheral controllers, such as those necessary to control a CD ROM drive, hard-disk drive, floppy disk drive, printer, to name a few options.

The CPU generally provides overall system control and, in response to user commands and program instructions retrieved from the system memory, controls the contents of graphics images to be displayed on the display unit. The display controller, which may for example be a video graphics architecture (VGA) controller, generally interfaces the CPU and the display driver circuitry, controls exchanges of graphics and/or video data with the frame buffer during display update and refresh operations, controls frame buffer memory operations, and performs additional processing on the subject graphics or video data, such as color expansion.

The frame buffer stores words of graphics or video data defining the color/gray-shade of each pixel of an entire display frame during processing operations such as filtering or drawing images. During display refresh, this "pixel data" is retrieved out of the frame buffer by the display controller pixel by pixel as the corresponding display pixels on the display screen are generated. The display driver circuitry converts digital data received from the display controller into the analog levels required by the display unit to generate graphics/video display images. The display unit may be any type of device which presents images to the user conveying the information represented by the graphics/video data being processed. The "display" may also be a printer or other document view/print appliance.

In order for the CPU to communicate with a given subsystem or resource, for example the display controller, the system memory or one of the peripheral controllers, the CPU must be capable of individually addressing that subsystem. In currently available systems, the CPU primarily communicates with the subsystems through "glue" or "core" logic. The glue (core) logic is typically programmed to assign each subsystem a unique set of addresses in the CPU address space as a function of socket or board position. The core logic then routes requests for access and/or commands to a selected subsystem via the expected socket. This technique is inflexible since subsystem function and the corresponding physical socket are inseparable. Thus for example, if a socket is assigned to maintain a memory module of a certain address space, it becomes impossible to insert therein a pin compatible module whose function is that of a graphics controller.

One specific instance where communication between the CPU and the various subsystems is important is during display generation and update. This is particularly true in high speed/high resolution display systems, where it may be desirable to distribute the display data processing tasks. In this case, the CPU must be able to efficiently access each of the various processing resources as required to effect display updates and other display control functions. Once this is done, the subsystems can manage simple tasks such as display refresh while the CPU is available to attend to more critical tasks.

Thus, the need has arisen for circuits, systems and methods for communicating with the various processing, control and memory resources in an information processing system. In particular, such circuits and systems and methods should be applicable to the control of the resources necessary to implement high definition/high speed display systems.

SUMMARY OF THE INVENTION

According to one embodiment of the principles of the present invention, an information processing system is provided which includes a subsystem having a processing resource and a bus interface, with an active logic mapping signal presented to a mapping input of the bus interface The system further includes a master processing device operable to write at least some bits of a starting address into the bus interface, determine an ending address for the subsystem, and lock the subsystem.

According to a second embodiment of the principles of the present invention, a system is provided which includes a plurality of subsystems, each having a mapping input and a mapping output. The system includes a bus coupled to each of the subsystems and a system master also coupled to the bus. The system master is operable to read information from a selected one of the subsystems via the bus, the selected subsystem being unmapped and having an active mapping signal presented at mapping input of the selected subsystem. The master is further operable to write starting address bits into the selected subsystem via the bus and determine an ending address for the selected subsystem using the information read therefrom.

The principles of the present invention are also embodied in novel methods. According to one such embodiment, a method is provided for address mapping a plurality of subsystems, each having a mapping input and a mapping output. A write command is presented to a selected subsystem to write into a selected subsystem at least some bits of a preselected starting address, the selected system being unmapped and having an active signal presented at the corresponding mapping input. An ending address is then determined for the selected subsystem and the selected subsystem locked.

The principles of the present invention provide substantial advantages over the prior art. Among other things, a system master can map the addresses of one or more associated subsystems each having an address base of an unknown size. Further, address mapping is no longer dependent on the socket/board position assigned to such subsystems. Additionally, these principles allow a system to be constructed in which multiple display controllers and/or frame buffers are used to independently drive corresponding regions on a display screen. Such application may be particularly advantageous in the design and implementation of high speed/high resolution display systems.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1–4 of the drawings, in which like numbers designate like parts.

Figure 1:
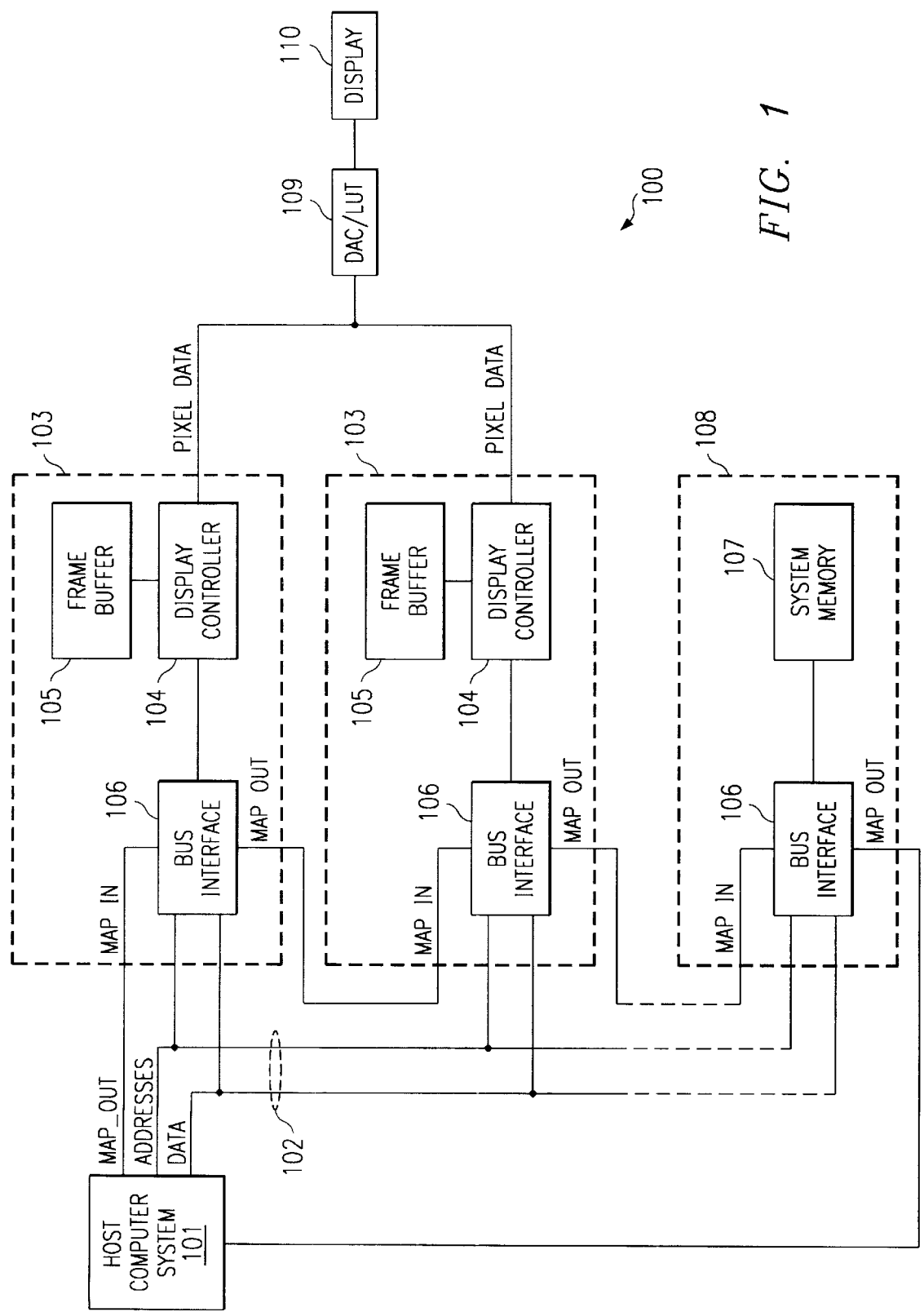
FIG. 1 is functional block diagram of a display processing system embodying the principles of the present invention.

FIG. 1 is a high level functional block diagram of a portion of a processing system 100 controlling the display of graphics and/or video data according to the principles of the present invention. System 100 includes a host computer system or central processing unit 101, a CPU local bus 102 and a plurality of independent display control units (subsystems) 103. In FIG. 1, two display control units 103 are shown for illustration purposes, although the exact number of display control units 103 will vary from one to a large number, depending on the requirements of the specific implementation.

Each independent display control unit 103 includes a display controller 104, frame buffer 105 and bus interface 106. Preferably, each display control unit 103 is fabricated on a single integrated circuit chip, although this is not a requirement to practice the present invention. One architecture suitable for implementing at least display controller 104 and frame buffer 105 on a single chip is described in co-assigned U.S. Pat. No. 5,473,573, application Ser. No. 08/239,608, on which the issue fee was paid Jul. 21, 1995, granted Dec. 5, 1995. A system memory system 108 is also coupled to bus 102 and includes a bus interface 106 along with one or more memory devices composing a system memory 107. System 100 further includes a digital to analog converter/color palette (look-up table) 109 and display device 110.

Host computer 101 is the "master" which controls the overall operation of system 100. Among other things, host computer 101 performs various data processing functions and determines the content of the graphics data to be displayed on display unit 107 in response to user commands and/or the execution of application software. Host computer 101 may be for example a general purpose microprocessor (CPU), such as an Intel Pentium class microprocessor or the like, a system controller, or stand-alone computer system. Host computer 101 communicates with the remainder of system 100 via CPU local bus 102, which may be for example a special bus or general bus, and a line carrying a mapping control signal (MAP).

Display controllers 104 may be any one of a number of commercially available display controllers suitable for driving a selected type of display unit and/or display resolution. For example, display controller 104 may be VGA controller, an LCD controller or a plasma display controller. Display controller 104 receives data, instructions and addresses from host computer 101 across bus 102. Generally, each display controller 104 controls screen refresh, executes a limited number of graphics functions such as line draws, polygon fills, color space conversion, display data interpolation and zooming, and video streaming and handles other ministerial chores such as power management.

Except as discussed below, system memory system 108 performs as a traditional system memory. Among other things, system memory 107 is used to store applications programs and other data and instructions required by host 101 during the execution of various processing functions. System memory 107 is preferably constructed from dynamic random access memory devices (DRAMS) but may also be constructed, either in whole or in part, from static random access memory devices (SRAMs). System memory 107 may also include off-processor (L2) cache memory.

Digital to analog converter/palette (display driver) 109 receives digital data from controller 104 and outputs the analog data to drive display 110 in response. Depending on the specific implementation of system 100, DAC 106 may also include YUV to RGB format conversion circuitry, and/or X- and Y-zooming circuitry, to name a few options. Display 110 may be for example a CRT unit, a liquid crystal display, electroluminescent display, plasma display, or other type of display device which displays images on a screen as a plurality of pixels. It should also be noted that in alternate embodiments, "display" 110 may be another type of output device such as a laser printer or similar document view/print appliance.

Figure 2A:
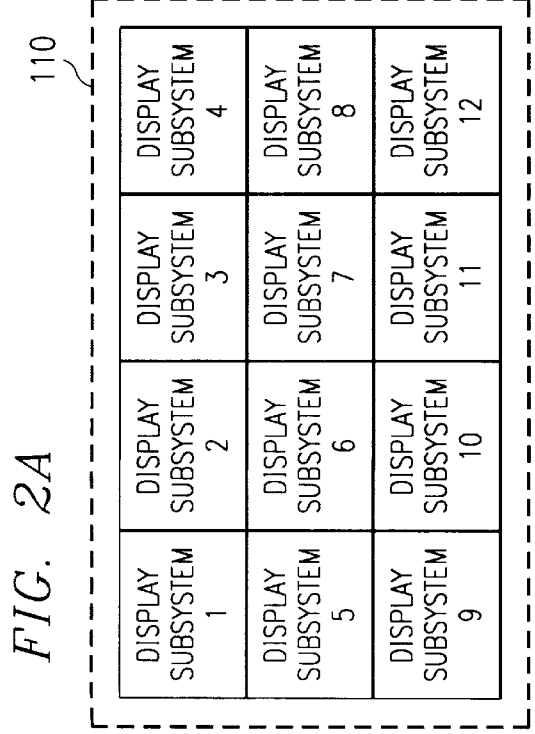
FIGS. 2A and 2B are diagrams depicting the display screen of a display device under the control of a display control system embodying the principles of the present invention, such as the display system shown in FIG. 1.

According to the principles of the present invention each display control unit 103 may each be assigned the responsibility for the control of display data of a respective region of the screen of display device 110. In FIG. 2A, the display screen has been divided into twelve (12) non-overlapping regions. In this case, system 100 would include twelve (12) display units (subsystems) 103, one each for each of the twelve screen regions. The number of screen regions and correspondingly the number of display control units (devices) 103 will vary from application to application, depending on such factors as desired display resolution, display screen size, and desired display generation speed, among other things.

Each bus interface 106 includes programmable prefix registers for holding one or more address bits (prefix bits) for uniquely identifying the corresponding unit 103. For discussion purposes assume that each subsystem 103/108 has an address space associated with a set of addresses. The number and length of the addresses required to sufficiently address a given subsystem will vary depending on the size of the address space of that subsystem. In the preferred embodiment, each address includes one or more higher order address bits ("prefix bits") which are used to uniquely identify and address the individual subsystems 103/108. The remaining lower order address bits are used to specifically address locations/resources internal to the subsystems themselves, such as specific locations within system memory 107 and selected frame buffer 105. The number and order of prefix bits will depend not only on the address spaces of the individual units 103 but also on the entire address space of all the units 103 together. Programming these registers is discussed in detail below. Further, each bus interface 106 performs some of the traditional functions found in conventional core logic, under the direction of master 101, such as the exchange of data, addresses, and instructions between host 101 and the corresponding display controller 104 and various timing and control functions.

Figure 2B:
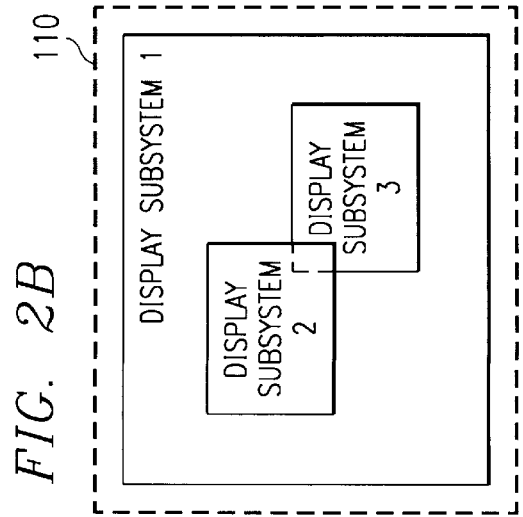

FIG. 2B illustrates a second application of the system shown in FIG. 1. In this case, multiple overlapping windows or regions of the display screen are each controlled by a display control unit 103. The windows may each represent graphics data, video data (including full motion video) or icons. For example, display unit 1 may be driving a graphics window, display unit 2 a video window, and display unit 3 one or more icons. As another example, display unit 1 may be generating the system window or desk top, display unit 2 a graphics window for a first application and display unit 3 a graphics window for a second application. Numerous other combinations are possible. Display control task partitioning, such as that illustrated in FIGS. 2A and 2B provides substantial advantages over the prior art. Among other things, while the data in the frame buffer 105 of one selected unit 103 is being updated, the remaining units 103 can continue to raster out data and refresh their corresponding screen regions. With multiple display controllers, more pixels can be generated/refreshed than could typically be handled by a single controller. This advantage will allow for the construction of higher resolution and/or larger display screens. Further, multiple display controllers can typically operate faster than a single controller for a given display screen size/resolution.

A preferred method of mapping the subsystems 103/108 of system 100 according to the principles of the present invention can now be described in detail. Initially, host computer 101 clears the memory map in which display control units 103 and system memory system 108 reside. Specifically, within each subsystem 103/108 the one or more bit positions of the prefix registers within each bus interface 106 are cleared to zero. In the preferred embodiment, host computer 101 presents a logic zero map enable signal on its MAP_OUT line to initiate the clear operation. The first subsystem in the chain, subsystem 103a, then clears its prefix registers and propagates the logic zero through its respective MAP OUT port to the MAP IN port of the next subsystem (subsystem 103b). The logic zero is similarly passed through the chain and finally back to host computer 101 from the last subsystem in the chain (subsystem 108) as an acknowledgement that initialization is complete.

After initialization is complete, master 101 starts the mapping procedure by setting the MAP enable signal on its MAP OUT port to the active (logic high) state. The MAP OUT ports of all of the subsystems 103/108 remain in the inactive (logic low) state at this point. Master 101 then presents a predetermined reference address on bus 102. The reference address is preferably address 0, but could be any other value within the address space of master 101. Selected reference address bits are latched into the prefix register of bus interface 106 of display unit 103a. In the preferred embodiment, master 101 then starts incrementing from the reference address to generate a sequence of addresses on bus 102. The sequence continues until the end of the address space of unit 103a is reached. The end of the address space may be determined by performing a comparison in the corresponding bus interface 106 between the addresses presented on bus 102 by master 101 and a stop (final or highest) address value indicative of the last address in the address space of unit 103a. The stop address value will equal the initial address loaded into the register for the subsystem 103/108 plus a fixed value representing the size (number of addresses) of the address space of that subsystem. Unit 103a preferably returns an opcode or other signal to master 101 via the data lines of system bus 102 indicating that the end of the address space has been reached.

When the end of the address space of unit 103a is reached, an acknowledgement is transmitted to master 101 across bus 102. Master 101 stores the initial and final addresses to first subsystem 103a (for example in registers) and the prefix (high order) bits of the addresses being output from master 101 are incremented. It should be noted that these prefix bits are incremented even if the count of the lower order bits has not reach the point at which a prefix bit incrementation would naturally occur in the address sequence. With regards to the lower order bits, master 101 preferably returns to zero, although master 101 may maintain the lower order bits from their current value. Mapping of unit 103a is now complete.

In alternative embodiments, it is not necessary for master 101 to increment through the address space of a given subsystem 103/108 in order to determine the address space sizes and consequently increment the prefix. For example, a given subsystem in a given slot may have a known address space. In this case, the master 101 simply loads the prefix and initial lower order address bits into the current subsystem and jumps to the prefix and initial address for the next subsystem. Further, each subsystem 103 may have internally coded a value indicating the size of its address space. This value may be output on bus 102 upon receipt of the initial address to that subsystem. Master 101 can then add this value to the prefix and initial address of the current subsystem to obtain the prefix and initial address of the next subsystem in the chain. The calculated value can then be loaded into the registers of the appropriate bus interface 106.

Next, the MAP OUT port of display unit 103a is set to active and the map signal (MAP) transmitted to the second subsystem in the chain, in this case display unit 103b. The new prefix resulting from prefix incrementation is latched into the corresponding bus interface 106 along with initial lower order address bits as the initial address for unit 103b. Latching preferably occurs with the rising edge of the map signal received at the MAP IN port of unit 103b. Master 101 increments as was done above, except from the new starting address. Master 101 continues to sequence through addresses until the last address in the address space of display unit 103b has been identified, as discussed above. Master 101 stores information identifying the initial and final lower order addresses to subsystem 103b and the address prefix is again incremented. Then, MAP OUT port of display unit 103b is then set active (high). The new prefix bits along with initial lower order address bits are latched into the registers of the next subsystem in the chain with the rising edge of the active mapping enable signal presented at the output of the MAP OUT port of display unit 103b.

The mapping procedure described above continues in a similar fashion until all the subsystems 103/108 have been mapped (i.e a prefix value uniquely identifying each subsystem 103/108 has been stored in the registers of the corresponding bus interface 106). In the illustrated system, the mapping proceeds through each of the display units 103 and the system memory system 108. At the conclusion of the mapping of the last subsystem in the chain (e.g. system memory system 108), the MAP OUT port of that subsystem goes active thereby signalling master 101 that mapping is complete.

It should be recognized that the address space of a particular subsystem may not require all the lower order address bits between incrementations of the prefix bits. In this case, master 101 can select a subset of lower address bits within the set of address bits associated with a value of the higher order address bits of the prefix. The master 101 may do such a selection, for example, to optimize use of its own address space. Further, two or more subsystems could be assigned a unique subset of the lower order address bits associated with a single prefix. In this case, the prefix bits would not be incremented at the transition between the address space of one system and that of another.

During normal operations to access a given subsystem 103/106, host computer 101 transmits an address on bus 102 which includes prefix bits identifying the target subsystem 103/108 and lower order bits identifying a location or resource within the subsystem 106/108. Each bus interface unit 106 compares the prefix of the address with the prefixes stored in its prefix registers. When a match occurs, the entire address is input and/or latched-in by the bus interface 106 storing the matching prefix bits for processing by the corresponding subsystem 103/108. This comparison may be implemented in any number of ways, for example by an array of exclusive-OR gates.

Figure 3:
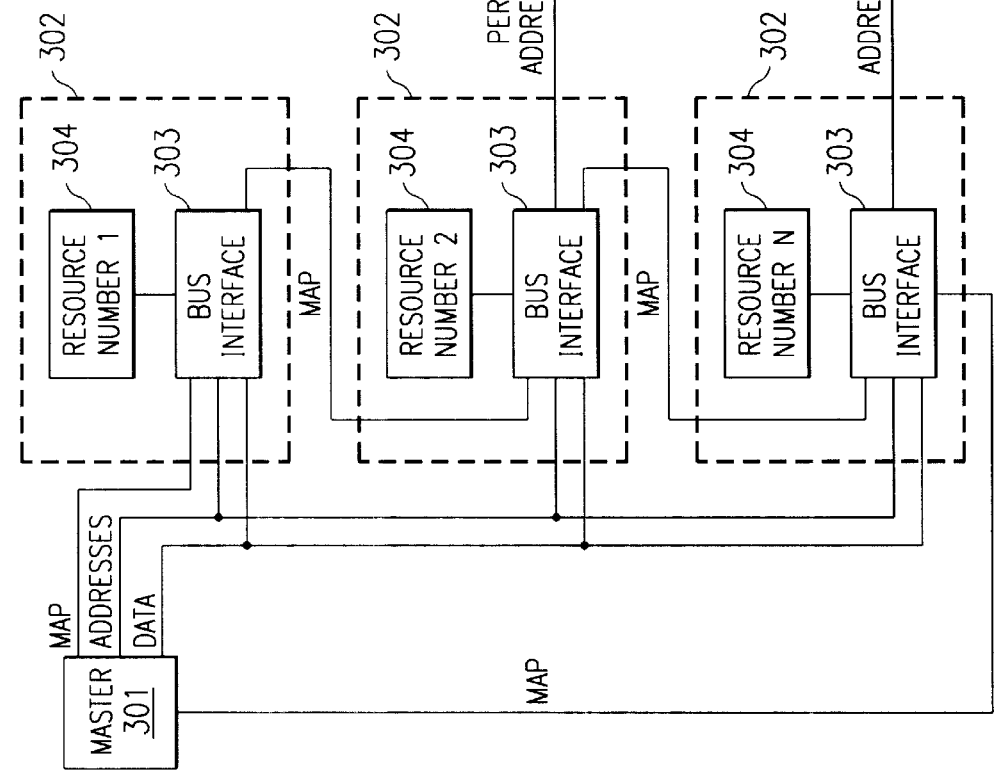
FIG. 3 is a functional block diagram of a general information processing system embodying the principles of the present invention.

The principles of the present invention are not limited to display control systems, such as system 100. A more generalized embodiment is shown in FIG. 3. System 3 includes a master 301 which may be for example a general purpose microcontroller, a controller, computer system, to name of few examples. Master 301 according to the principles of the present invention is configured to propagate the mapping signal MAP and generate the prefixes and local (low order) addresses required to implement the memory mapping procedure discussed above.

System 300 further includes a plurality of subsystems or units 302 under the general control of master 301. Each subsystem 302 includes a bus interface 303 and resource 304. For a given subsystem 302, bus interface 303 and resource 304 may be fabricated together on a single chip or may each comprise one or more discrete chips. Each bus interface 303 operates in accordance with the mapping principles of the present invention discussed above. Further, a given bus interface 303 may also provide an interface for delivering data and addresses to peripheral devices, depending on the type of the associated resource 304. A given resource 304 may be for example a memory device (e.g. system memory, cache memory, or a frame buffer), a display controller, bus bridge, hard drive controller, clock generator, coprocessor, to name a few possibilities.

Figure 4:
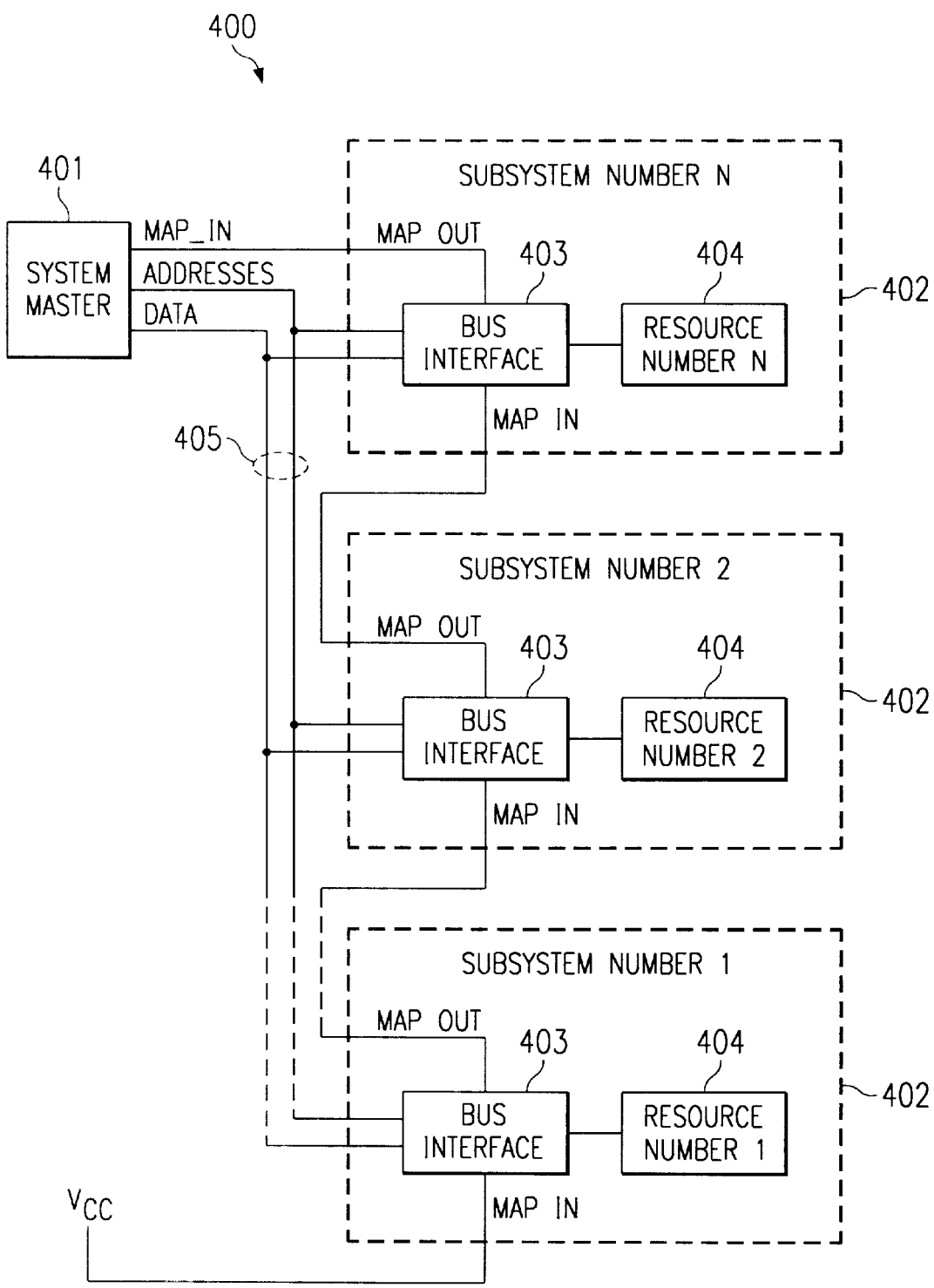
FIG. 4 is a functional block diagram of an additional exemplary general information processing system embodying the principles of the present invention.

FIG. 4 is a functional block diagram of an alternate general information processing system 400 according to the principles of the present invention. As in the case of system 300, system 400 includes a master or host 401 which may be a general purpose microprocessor, a controller, stand alone computer system, among other things. However, master 401 in the embodiment of system 400 does not initiate the rippling of a mapping signal; as is shown in FIG. 4, master 401 preferably only receives a mapping signal at its mapping signal input MAP_IN at the completion of the mapping process described below.

System 400 further includes a plurality of N number subsystems or units 402 under the general control of master 401. Each subsystem 402 includes a bus interface 403 and resource 404. For a given subsystem 402, bus interface 403 and resource 404 may be fabricated together on a single chip or may each comprise one or more discrete chips. Each bus interface 403 interfaces with a bus 405 which includes lines for exchanging addresses and data with master 401. Further, a given bus interface 403 may also provide an interface for delivering data and addresses to peripheral devices (not shown), depending on the type of the associated resource 404. A selected resource 404 may be for example a memory device (e.g. system memory, cache memory, or a frame buffer), a display controller, bus bridge, hard drive controller, clock generator, floppy drive controller, coprocessor, among other possibilities.

In general, each bus interface 403 includes the address registers discussed above, for storing at least a unique prefix assigned to the corresponding subsystem 402. Alternatively, registers may be provided to store entire starting and ending addresses assigned to the subsystem. Preferably, each bus interface also includes programmable registers or hardwired circuits for storing data describing various functions and characteristics of the associated subsystem 402. For example, such information may identify the type of resource 404 and the size of its associated address space.

The mapping inputs MAP IN and mapping outputs MAP OUT of the subsystems 402 are chained together in a manner similar to that which was described above, except that the mapping input of the first subsystem 402 (subsystem #1) is tied to a predetermined active logic level and the mapping output of the last subsystem 402 (subsystem #N) is coupled to the mapping input of master controller 401. In the embodiment of FIG. 4, the input of the first subsystem is tied to a logic high level or Vcc, although a reverse mapping logic may alternatively be used throughout the system and consequently the first mapping input would be set to a logic low level.

Master 401 controls the mapping of subsystems 402 through the issuance of commands, addresses and/or data across the address and data lines of bus 405. These commands, address and/or data are preferably issued under software control, but may also output in response to a hardwired routine, such as state machine, or under the control of embedded firmware. As a result, and as will become more apparent below, system 400 advantageously does not require the counting of clock pulses, eliminates asynchronous delays and allows master 401 to map each subsystem on an individual basis after initial programming.

In the initial state, all subsystems 402 are unmapped and the MAP OUT outputs of all subsystems 402 within system 400 are turned off. The unmapped state may be achieved either automatically upon system power up or in response to an express command (Command_Unmap_All) from master 401.

The mapping begins with Subsystem 1, since this is the only device which is initially both unmapped and has an active (in this example. logic high) mapping signal at its MAP IN port. The first command issued by master 401 is preferably a read command (Command_Read_Device_Type) for reading back stored information about Subsystem 1 discussed above, for example the device type and the size of the address space.

Next, a starting address write command (Command_Write_Start_Address) is output from master 401 onto bus 405. This command allows master 401 to write into the bus interface 403 of the target subsystem, in this case subsystem 1, at least the prefix bits of a starting address selected for that subsystem and presented bus 405. In the preferred embodiment, master 401 writes in prefix bits selected for the subsystem and sets the lower order bits to zero, as was done above. Alternatively, master 401 may write an entire starting address into the target subsystem.

The ending address for the target subsystem can then be calculated, by master 401 or within the target subsystem 402 itself, from the starting address and the device information stored within the subsystem 402. Preferably, each subsystem 402 includes an adder or similar circuit which adds a stored value or factor indicative of the size of the address space of that subsystem to the starting address written-in by master 401 to obtain the device ending address. The subsystem 402 may store the ending address, although this is optional. Master 401 can then read back, verify and store the ending address for the target device using a read ending address command (Command_Read_Ending_Address). Alternatively, master 401 can determine the ending address of the subsystem simply from the above step of reading back information stored within the subsystem indicative of device type, the type of device implying an address space of a given size.

With the starting and ending addresses established, the target subsystem, subsystem 1, is locked. Locking is accomplished by master 401 using a lock command, Command_Lock_Device_Map. Once locked, a subsystem 402 will not respond to any command other than an unmap (unlock) command directed to that device. The lock command also turns-on the MAP OUT port of the target device, in this case subsystem 1.

The mapping procedure is repeated sequentially until all of the subsystems 402 in the chain have been mapped. For example, after subsystem 1 is mapped, subsystem 2 is mapped, since only subsystem 2 is unlocked (unmapped) and has an active mapping signal at its MAP IN port.

When the last subsystem 402 in system 400 is mapped, the mapping signal is presented to the MAP IN port of master 401. Master 401 may then individually re-map one or more devices, as required. For example, it may be desirable to move the address set mapped for a given subsystem 402 to another space within the overall address space of system 400 to optimize performance. Or, during the original mapping, the address sets of two or more subsystems may overlap. In either case, master 401 may re-map subsystems on an individual basis such that the addresses sets are seamlessly continuous and non-overlapping.

To re-map a given subsystem 402, master 401 issues an unlock command Command_Unlock_Device_Map to the device selected for remapping and repeats the mapping process. In this instance, master 401 simply writes a new starting address to the selected subsystem to "move" the address set for that subsystem within the address space of the system.

Once all mapping and remapping, if any, is complete, system 400 is configured for information processing operations. Preferably, master 401 activates all of the subsystem devices 402 using a command Command_Activate_Device_All.

The principles of the present invention provide substantial advantages over the prior art. Among other things, the system master can map the addresses of one or more subsystems each having an address space of an unknown size. Further, address mapping is no longer dependent on the socket/board position of the subsystems. Additionally, a system can be implemented in which multiple display controllers and/or frame buffers are used to independently drive corresponding regions on a display screen. One particularly advantageous application of the principles of the present invention is in high speed/high resolution display systems.

Although the present invention and its advantages have been described in detail, it should be understood that various changes, substitutions and alterations can be made herein without departing from the spirit and scope of the invention as defined by the appended claims.

What is claimed is:

1. An information processing system comprising:
   a subsystem including a processing resource and a bus interface, an active logic mapping signal presented to a mapping input of said bus interface; and
   a master processing device operable to:
      write at least some bits of a starting address into said bus interface;
      determine an ending address for said subsystem by:
         incrementing from said starting address bits to generate a sequence of addresses;
         presenting the sequence of addresses to the bus interface; and
         receiving a signal from said bus interface indicating that said sequence of addresses has reached an end to an address space of said bus interface;
      lock at least said starting address into said subsystem; and
      cause said active logic mapping signal to appear at a memory mapping output of said bus interface for rippling to another device.

2. The information processing system of claim 1 wherein said master processing device is operable to determine said ending address from information read from said subsystem.

3. The information processing system of claim 2 wherein said information read from said subsystem comprises device type information.

4. The information processing system of claim 2 wherein said information read from said subsystem represents a size of an address space of said subsystem.

5. The information processing system of claim 1 wherein said master processing device determines said ending address by reading back an ending address from said subsystem.

6. The information processing system of claim 5 wherein said subsystem calculates said ending address by adding a stored value to said at least some bits of said starting address.

7. The information processing system of claim 5 wherein said master processing device is further operable to activate a mapping output of said subsystem.

8. The information processing system of claim 1 wherein said mapping input is tied to a fixed voltage.

9. A system comprising:
   a plurality of subsystems, each including a mapping input and a mapping output;
   a bus coupled to each of said subsystems; and
   a system master coupled to the bus and operable to:
      write starting address bits into said selected subsystem via said bus;
      determine an ending address for said selected subsystem by:
         incrementing from said starting address bits to generate a sequence of addresses;

presenting the sequence of addresses to the selected subsystem; and receiving a signal from said selected subsystem indicating that an end of an address space of said selected subsystem has been reached, said signal generated by said selected subsystem by comparing each of said sequence of addresses with a reference value: and cause said selected subsystem to ripple said active mapping signal from said mapping output to said mapping input of a second said subsystem.

10. The system of claim 9 wherein said information read from said selected subsystem comprises a value representing a size of an address space of said selected subsystem.

11. The system of claim 9 wherein said information read from said selected subsystem comprises said ending address.

12. The system of claim 11 wherein said ending address is calculated within said selected subsystem from said starting address.

13. The system of claim 9 wherein said subsystem comprises:

a bus interface coupled to said bus; and an information processing resource.

14. The system of claim 13 wherein said information processing resource comprises memory.

15. The system of claim 13 wherein said information processing resource comprises a controller.

16. A method of address mapping a plurality of subsystems, each having a mapping input and a mapping output, the method comprising the steps of:

presenting a write command to a selected subsystem to write therein at least some bits of a preselected starting address, the selected subsystem being unmapped and having an active signal presented at the corresponding mapping input;

determining an ending address for the selected subsystem comprising the substeps of:

incrementing from the starting address bits to generate a sequence of addresses;

presenting the sequence of addresses to the selected subsystem;

comparing each of the sequence of addresses with a reference address associated with the selected subsystem; and determining the ending address when the current address of the sequence matches the reference address;

locking the at least some bits of the starting address into the selected subsystem; and causing the selected subsystem to ripple the mapping signal to another of the subsystems through the mapping output of the selected subsystem.

17. The method of claim 16 and further comprising the step of presenting a command to unmap the plurality of subsystems prior to said step of presenting a write command.

18. The method of claim 16 and further comprising the step of presenting a read command to the selected subsystem to retrieve therefrom information characterizing the selected subsystem.

19. The method of claim 16 wherein said step of writing at least some bits of a preselected starting address comprises the step of writing prefix bits.

20. The method of claim 16 and further comprising the step of presenting a command to the selected subsystem to output an active mapping signal at the mapping output of the selected subsystem.

21. The method of claim 16 wherein said step of determining an ending address comprises the substep of adding a value representing the size of an address space of the selected subsystem with the at least some bits of the starting address.

22. The method of claim 21 wherein said step of determining is performed within the selected subsystem.

23. The method of claim 18 wherein the retrieved information comprises device type information.

* * * * *